(12) United States Patent
Schwindt (10) Patent No.: US 11,360,472 B2
(45) Date of Patent: Jun. 14, 2022

(54) AIRCRAFT AND METHOD OF CONTROLLING

(71) Applicant: GE Aviation Systems Limited, Cheltenham (GB)

(72) Inventor: Stefan Alexander Schwindt, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 93 days.

(21) Appl. No.: 16/709,359

(22) Filed: Dec. 10, 2019

(65) Prior Publication Data
US 2020/0183382 A1    Jun. 11, 2020

(30) Foreign Application Priority Data
Dec. 11, 2018   (GB) ...................... 1820114

(51) Int. Cl.
| | |
|---|---|
| G05D 1/00 | (2006.01) |
| B64D 11/06 | (2006.01) |
| B64D 43/00 | (2006.01) |
| B64D 45/00 | (2006.01) |
| G05D 1/10 | (2006.01) |
| G08G 5/00 | (2006.01) |

(52) U.S. Cl.
CPC ....... G05D 1/0055 (2013.01); B64D 11/0689 (2013.01); B64D 43/00 (2013.01); B64D 45/00 (2013.01); G05D 1/0011 (2013.01); G05D 1/101 (2013.01); G08G 5/0039 (2013.01)

(58) Field of Classification Search
CPC .... G05D 1/0055; G05D 1/0011; G05D 1/101; B64D 11/0689; B64D 43/00; B64D 45/00; G08G 5/0039
See application file for complete search history.

(56) References Cited

U.S. PATENT DOCUMENTS

| | | | |
|---|---|---|---|
| 4,540,979 | A | 9/1985 | Gerger et al. |
| 5,243,339 | A | 9/1993 | Graham et al. |
| 5,900,827 | A | 5/1999 | Graham et al. |
| 6,070,098 | A | 5/2000 | Moore-Ede et al. |
| 7,301,464 | B2 | 11/2007 | Coulter |
| 7,437,225 | B1 | 10/2008 | Rathinam |
| 8,164,464 | B2 | 4/2012 | Matos |
| 8,200,379 | B2 | 6/2012 | Manfredi et al. |
| 8,552,850 | B2 | 10/2013 | De Mers et al. |
| 8,766,819 | B2 | 7/2014 | Dorfmann et al. |
| 8,928,498 | B2 | 1/2015 | Dorneich et al. |

(Continued)

FOREIGN PATENT DOCUMENTS

| | | |
|---|---|---|
| EP | 3196725 A1 | 7/2017 |
| KR | 101663922 B1 | 10/2016 |

OTHER PUBLICATIONS

European Patent Office, Extended Search Report re Corresponding Application No. 19214618.1-1203, May 12, 2020, 8 pages, Munich, Germany.

*Primary Examiner* — Hussein Elchanti
(74) *Attorney, Agent, or Firm* — McGarry Bair PC (57) ABSTRACT

A method of controlling an aircraft includes tracking, using at least one sensor, one of an input by a pilot or a biometric parameter of a first pilot during flight of the aircraft. The method also includes determining a lack of attention by the pilot or a depth of sleep of the pilot based on the biometric parameter.

19 Claims, 5 Drawing Sheets

(56) References Cited

U.S. PATENT DOCUMENTS

| | | |
|---|---|---|
| 9,227,736 B2 | 1/2016 | Whitlow et al. |
| 9,310,222 B1 * | 4/2016 | Suiter .................. G01C 23/005 |
| 9,446,852 B2 | 9/2016 | Lacko et al. |
| 9,613,543 B2 | 4/2017 | Whitlow et al. |
| 9,637,133 B1 | 5/2017 | McCusker et al. |
| 9,701,418 B2 | 7/2017 | Nelson et al. |
| 9,786,189 B2 | 10/2017 | Loussides et al. |
| 9,905,108 B2 | 2/2018 | Kaplan et al. |
| 9,919,712 B1 | 3/2018 | Doyen et al. |
| 2009/0109038 A1 * | 4/2009 | Christophe ............ B64D 47/00 340/576 |
| 2009/0267777 A1 | 10/2009 | Kumar et al. |
| 2010/0004803 A1 * | 1/2010 | Manfredi ................ B64D 25/00 701/14 |
| 2010/0030406 A1 * | 2/2010 | Christophe ............ G01C 21/00 701/14 |
| 2010/0134302 A1 | 6/2010 | Ahn et al. |
| 2011/0224849 A1 * | 9/2011 | Braly ................ B64D 45/0015 701/9 |
| 2012/0075123 A1 | 3/2012 | Keinrath et al. |
| 2012/0116186 A1 | 5/2012 | Shrivastav et al. |
| 2014/0343765 A1 * | 11/2014 | Suiter .................. G08G 5/0021 701/18 |
| 2016/0090097 A1 * | 3/2016 | Grube ...................... A61B 5/18 340/576 |
| 2016/0354026 A1 | 12/2016 | Zohar |
| 2017/0213467 A1 * | 7/2017 | Loussides ............ A61B 5/0059 |
| 2017/0336789 A1 | 11/2017 | Sane et al. |
| 2018/0186379 A1 | 7/2018 | Brooks et al. |

* cited by examiner

AIRCRAFT AND METHOD OF CONTROLLING

CROSS REFERENCE TO RELATED APPLICATION(S)

This application claims priority to and benefit of GB Patent Application No. 1820114.5 filed Dec. 11, 2018, which is incorporated herein in its entirety.

BACKGROUND

Contemporary aircraft travel flight paths that generally includes a climb, a cruise, and a descent. Pilots along with flight management systems (FMS) implement the flight plan. The FMS may generate the flight plan by taking into account parameters specific to the aircraft and to the flight conditions such as the payload, the weight of the aircraft, the quantity of fuel onboard, temperature, wind, altitude, etc., and of the time constraints imposed by the air traffic control. The flight plan may describe all the waypoints or positions through which the aircraft is to pass, with the altitude and corresponding speed at each waypoint.

BRIEF DESCRIPTION

In one aspect, the disclosure relates to a method of controlling an aircraft. The method includes tracking, using at least one sensor, one of an input by a first pilot or a biometric parameter of a first pilot during flight of the aircraft, determining, using a controller that is operatively connected to the at least one sensor, a lack of attention by the first pilot or a depth of sleep of the first pilot based on the biometric parameter, allowing a predetermined amount of lack of attention by the first pilot or controlled rest, and controlling at least one system of the aircraft when the determined lack of attention or determined depth of sleep satisfies a predetermined threshold.

In another aspect, the disclosure relates to a method of controlling an aircraft. The method includes tracking, using at least one sensor, a biometric parameter of a first pilot during flight of the aircraft, determining, using a controller that is operatively connected to the at least one sensor, a lack of attention or depth of sleep of the pilot based on the biometric parameter, allowing a predetermined amount of lack of attention or depth of sleep, and modifying access to a system of the aircraft when the amount of lack of attention or depth of sleep satisfy a predetermined threshold.

DETAILED DESCRIPTION

Aspects of the present disclosure are directed to a method of controlling an aircraft. During operation of an aircraft, portions of a flight plan such as takeoff or landing can require significant operator attention or alertness for operation. Other portions of a flight plan, such as cruise during long flights, may allow for minimal pilot attention or alertness for operation of the aircraft. It can be beneficial to allow a pilot to rest during appropriate portions of flight in the event of pilot fatigue, as well as to detect fatigue or incapacitation of a pilot during flight.

Pilot incapacitation can occur due to events such as decompression or due to illness or fatigue of the pilot. In an example where a pilot is fatigued, pilot incapacitation can take the form of an uncontrolled deep sleep or the form of "microsleep" wherein a pilot appearing to be awake is actually experiencing brief (approximately 1-10 seconds) periods of sleep or loss of attention. It can be beneficial to track an attention level of a pilot or to detect that a pilot is incapacitated and act accordingly.

During long flights, or during particular portions of a given flight, pilots may be allowed a controlled rest (also referred to as "controlled sleep" or "in-seat rest") to reduce operator fatigue. Typically, a co-pilot will take over control of the aircraft while the pilot briefly sleeps. A member of the cabin crew can also periodically call the co-pilot during this time to ensure alertness of the co-pilot.

During a controlled rest, the pilot's level of sleep enters a "Stage 1" or drowsy sleep when transitioning from waking to sleep, followed by "Stage 2" or shallow sleep. It is contemplated that a pilot can experience a transition period of "sleep inertia" wherein performance, alertness, or judgment can be briefly impaired upon wakening, and a recovery period of 20-30 minutes can be allotted for the pilot to fully regain alertness after a controlled rest. If a pilot is allowed to enter deeper sleep stages, sleep inertia can have a greater effect on the pilot or last for a longer time. It can be advantageous to prevent a pilot from entering deep sleep during a controlled rest so that such sleep inertia does not have such great effects.

For purposes of illustration, the present disclosure will be described in the context of a flight management system in an aircraft environment. It will be understood, however, that the disclosure is not so limited and may have general applicability in non-aircraft applications, such as other mobile applications.

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Figure 1:
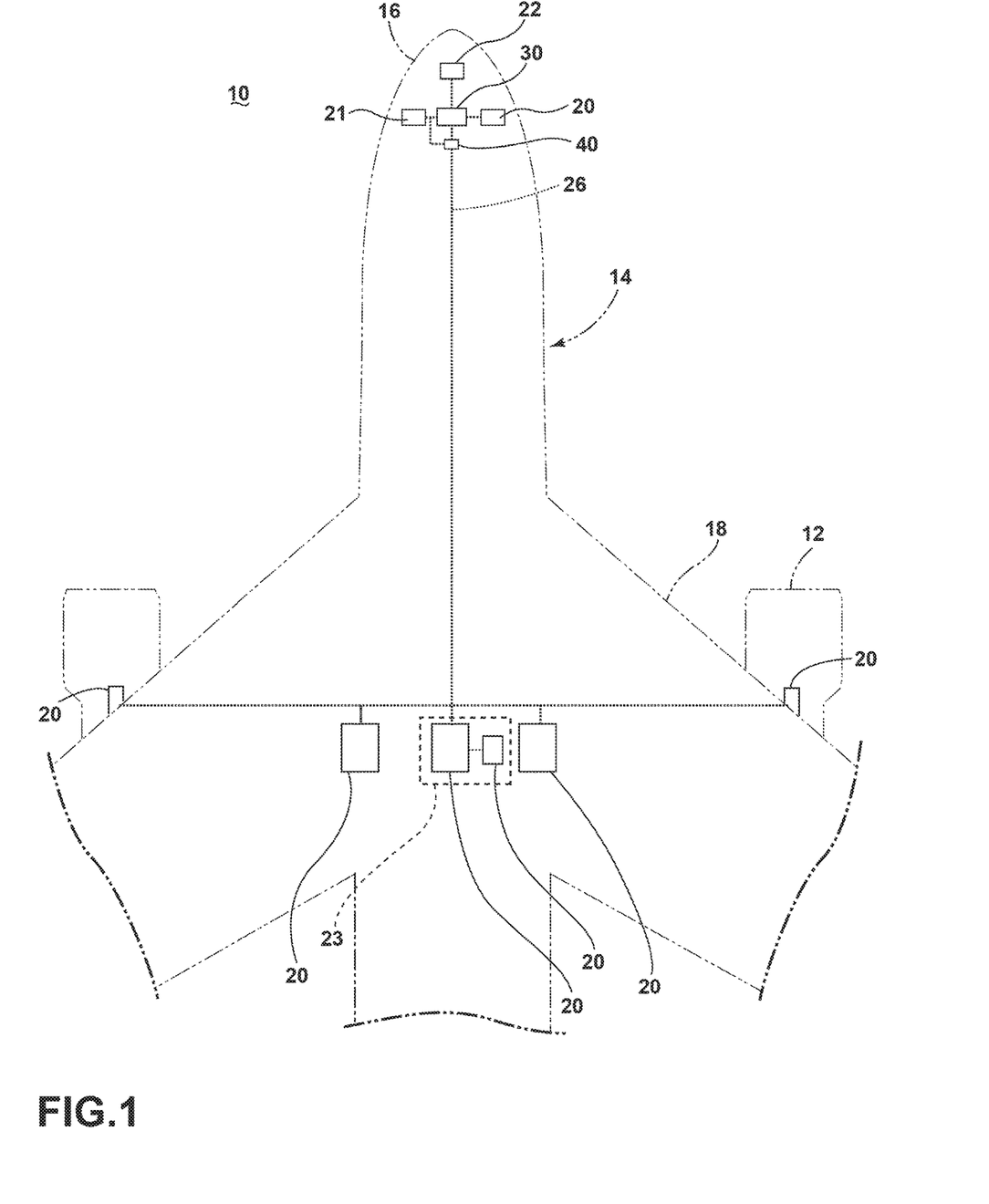
FIG. 1 is a top-down schematic view of a portion of an aircraft according to various aspects described herein.

FIG. 1 schematically illustrates an aircraft 10 according to various aspects described herein. One or more propulsion engines 12 can be coupled to a fuselage 14, a cockpit 16 can be positioned in the fuselage 14, and wing assemblies 18 can extend outward from the fuselage 14. A plurality of aircraft systems 20 that enable proper operation of the aircraft 10 can be included as well as a flight control computer 22 (or "computer" 22). While a commercial aircraft has been illustrated, it is contemplated that aspects of the disclosure can be used in any type of legacy aircraft, for example, without limitation, fixed-wing, rotating-wing, rocket, or personal aircraft.

The plurality of aircraft systems 20 can reside within the cockpit 16, within an electronics and equipment bay 23, or in other locations throughout the aircraft 10 including that they can be associated with the engines 12. Such aircraft systems 20 can include but are not limited to: an electrical system, an oxygen system, hydraulics and/or pneumatics system, a fuel system, a propulsion system, navigation systems, flight controls, audio/video systems, an Integrated Vehicle Health Management (IVHM) system, and systems associated with the mechanical structure of the aircraft 10. A variety of aircraft systems 20 have been illustrated for exemplary purposes and it will be understood that they are only a few of the systems that can be included in the aircraft 10.

A data network 26 over which the plurality of aircraft systems 20 can communicate with each other and provide information to a crew of the aircraft 10 can be included. For example, the aircraft systems 20 can output various information to a flight deck 30 located in a cockpit 16 of the aircraft 10.

A communication interface 40 can be located within the aircraft 10 and operably coupled to at least some of the plurality of aircraft systems 20. The communication interface 40 has been illustrated as being included in the cockpit 16. It is contemplated that the communication interface 40 can be located in other locations within the aircraft 10 including within the electronics and equipment bay 23. Although only one communication interface 40 has been illustrated, it is contemplated that the aircraft 10 can have multiple communication interfaces. The communication interface 40 can be utilized for communication with other aircraft or a ground station (not shown), such as by radio contact in a non-limiting example. In addition, the communication interface 40 can transmit or receive data, including audio or visual data as appropriate.

Figure 2:
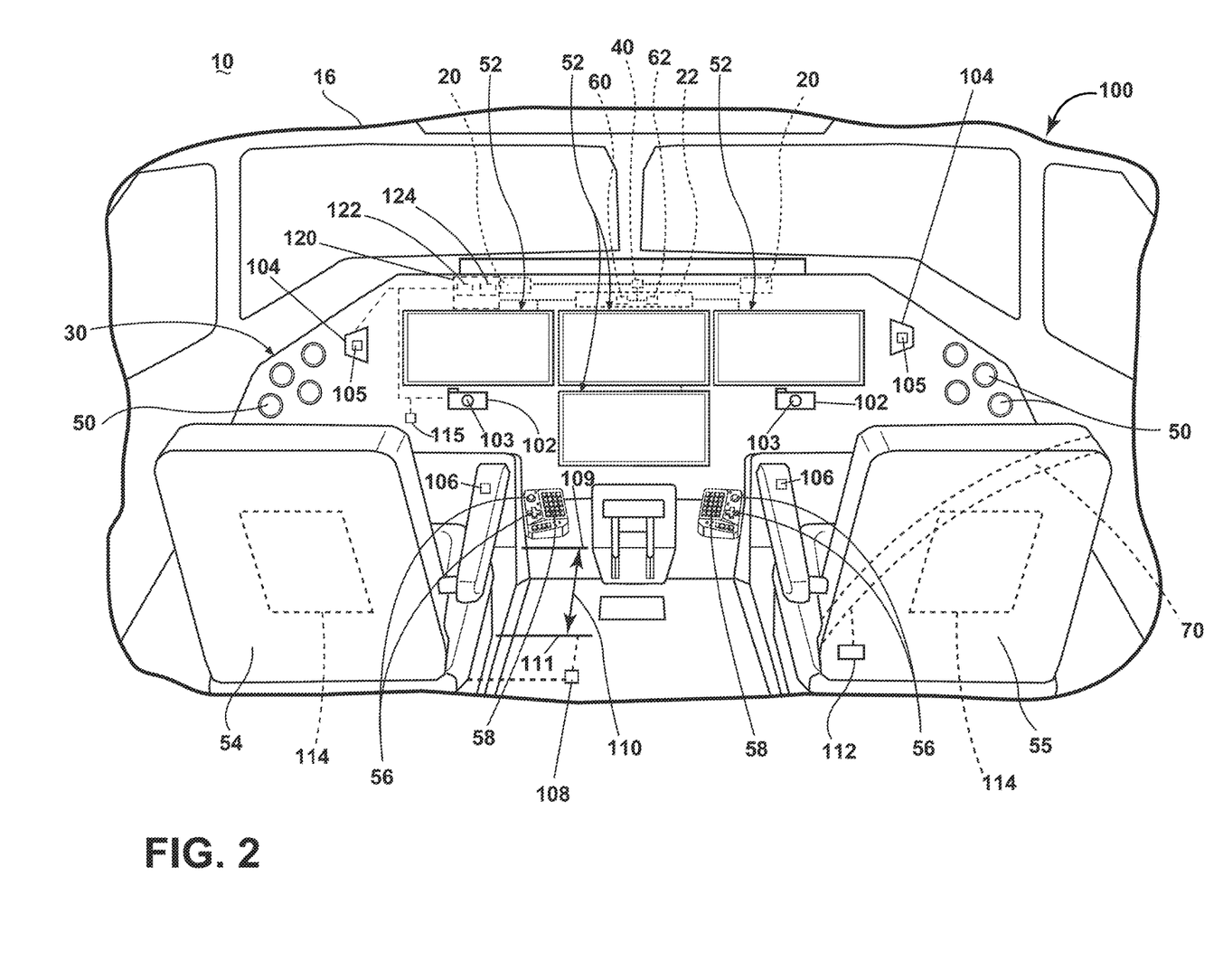
FIG. 2 is a perspective view of a cockpit of the aircraft of FIG. 1 including an attention tracking system according to various aspects described herein.

FIG. 2 illustrates a portion of the cockpit 16 of the aircraft 10 and an exemplary flight deck 30 having various instruments 50 and flight displays 52. A first pilot (herein, a "pilot") can be present in a seat 54 at the left side of the cockpit 16 and a second pilot (herein, a "co-pilot") can be present at the right side of the cockpit 16 in a seat 55 and the flight deck 30 can be located in front of the pilot and co-pilot and can provide the flight crew with information to aid in operating the aircraft 10. The flight displays 52 can include either primary flight displays or multi-function displays and can display a wide range of aircraft, flight, navigation, and other information used in the operation and control of the aircraft 10. Further, both the various instruments 50 and flight displays 52 of the flight deck 30 can provide one or more visual indicia indicative of a corresponding health condition of one or more of the aircraft systems 20.

The instruments 50 and flight displays 52 can be laid out in any manner including having fewer or more instruments or displays. Further, the flight displays 52 need not be coplanar and need not be the same size. A touch screen display or touch screen surface can be included in the flight display 52 and may be used by one or more flight crew members, including the pilot and co-pilot, to interact with the systems of the aircraft 10. Such touch screen surface can take any suitable form including that of a liquid crystal display (LCD) and can use various physical or electrical attributes to sense inputs from the flight crew. It is contemplated that the flight display 52 can be dynamic and that one or more cursor control devices 56 and/or one or more multifunction keyboards 58 can be included in the cockpit 16 and can be used by one or more flight crew members to interact with the systems of the aircraft 10. In this manner, the flight deck 30 can be considered a user interface for the aircraft systems 20 and the aircraft 10.

The flight control computer 22 can be operably coupled to components of the aircraft 10 including the aircraft systems 20, instruments 50, flight displays 52, touch screen surfaces, cursor control devices 56, keyboards 58, etc. The flight control computer 22 can receive inputs from any number of aircraft systems 20 or software programs responsible for managing the acquisition and storage of data. The flight control computer 22 can also be in the form of a controller, and can be connected with other controllers of the aircraft 10. The flight control computer 22 can include memory 60 and processing units 62, which can be running any suitable programs to implement a graphical user interface (GUI) and operating system. The flight control computer 22 can include or be associated with, any suitable number of individual microprocessors, power supplies, storage devices, interface cards, auto flight systems, flight management computers, and other standard components. The flight control computer 22 can include or cooperate with any number of software programs (e.g., flight management programs) or instructions designed to carry out the various methods, process tasks, calculations, and control/display functions necessary for operation of the aircraft 10.

The communication interface 40 can be communicably coupled to the flight control computer 22 or other processors of the aircraft 10 as well as any number of the plurality of aircraft systems 20 to transfer information on and off the aircraft 10. The communication interface 40 can include any desired communication mechanism capable of wirelessly linking with other systems and devices, such as by radio contact in a non-limiting example. For example, one of the aircraft systems 20 can be in the form of a distress tracker 21 configured to transmit a state of aircraft distress (for example, "normal," "abnormal," or "distressed").

A pilot attention tracking system or tracking system 100 is illustrated as being in communication with the flight control computer 22. It will be understood that the tracking system 100 can be hard wired to the flight control computer 22 or can communicate in any suitable manner with the flight control computer 22 including via wireless communication. Alternatively, the tracking system 100 can be included as a module within the flight control computer 22.

The tracking system 100 can include at least one imaging module 102 and at least one audio module 104. The imaging module 102 can include an image sensor 103 configured to sense visual information about a pilot or co-pilot, such as eyes being open or closed, a direction of gaze, or a facial state such as eyebrows raised or lowered, by way of non-limiting examples and provide an output signal based thereon. The imaging module 102 or the flight control computer 22 can also be in signal communication with any of the flight displays 52, such as to display a visual indication based on the sensed visual information from the imaging module 102.

The audio module 104 can include an audio sensor 105 configured to sense audio information about a pilot or co-pilot, such as a language being spoken in the cockpit 16, a voice volume, slurred or altered speech, a speech pattern, or sounds that can occur due to pilot or co-pilot interaction with an aircraft system 20 such as striking the flight deck 30 or typing on the multifunction keyboard 58 and provide an output signal based thereon. The audio module 104 can also provide audio feedback or sound to the pilot or co-pilot, such as through speakers mounted within the cockpit or through headphones worn by the pilot or co-pilot. Further, the audio module 104 can be in signal communication with the imaging module 102. For example, the imaging module 102 can provide an indication for transmission through the audio module 104, such as spoken commands in a low-visibility environment within the cockpit 16. The audio module 104 can also provide a signal for transmission via the imaging module 102, such as a flashing light display or text-based indicator to be read by a pilot or co-pilot.

At least one biometric sensor 106 configured to sense a biometric parameter of the pilot or co-pilot can be included in the tracking system 100. For example, a biometric sensor 106 positioned on the first seat 54 can be configured to sense or detect a heart rate, breathing rate, perspiration rate, or bodily motion of the pilot when the pilot is sitting in the first seat 54. Alternatively, the biometric sensor 106 can be positioned on a wearable device such as a wrist strap or headband. In still another example, the biometric sensor 106 can be in the form of an optical sensor, e.g. a camera that monitors the pilot or co-pilot.

In addition, a seat tracking module 108 can control a seat distance 110 between the first seat 54 and the flight deck 30. While not shown, the second seat 55 can also include such a seat tracking module 108. Further, a seat belt sensor 112 can sense the position of a seat belt 70 on the first seat 54 or the second seat 55, such as the seat belt 70 being buckled or unbuckled.

A haptic feedback generator 114 can be coupled or integrated with either or both of the first and second seats 54, 55. The haptic feedback generator 114 can be configured to vibrate, such as a steady or varying vibration pattern, to provide feedback to the pilot or co-pilot. In a non-limiting example wherein the aircraft 10 is not level during flight in low-visibility conditions, the haptic feedback generator 114 can vibrate on a right-hand portion or left-hand portion of the seat 54, 55 to indicate to a pilot or co-pilot which direction to bank the aircraft 10 for correct orientation when flying.

A timer 115 can also be included in the tracking system 100 and is illustrated as being coupled to the flight deck 30. The timer 115 can be positioned anywhere within or outside of the cockpit 16. The timer 115 can be configured to track an elapsed time of an event or to provide an alarm or other indication at a predetermined time. Non-limiting examples where the timer 115 can be utilized include tracking an elapsed time of flight, an elapsed time of a pilot interaction with an aircraft system 20 (such as updating flight records via the multifunction keyboard 58), tracking an elapsed sleep time, indicating a time for changing a flight direction, or indicating a wake time.

An additional controller 120 having a processor 122 and a memory 124 can also be included in the tracking system 100. The controller 120 is illustrated as being coupled to the flight deck 30 and in signal communication with any or all of the flight control computer 22, instruments 50, flight displays 52, memory 60, processing unit 62, imaging module 102, audio module 104, biometric sensor 106, seat tracking module 108, seat belt sensor 112, haptic feedback generator 114, or timer 115. Dashed lines have been used to illustrate a portion of the signal connection between the above-described components. The lack of a dashed line for signal connections is done for clarity of the figures, and it will be understood that components not connected by a dashed line can nonetheless be in signal communication.

Figure 3:
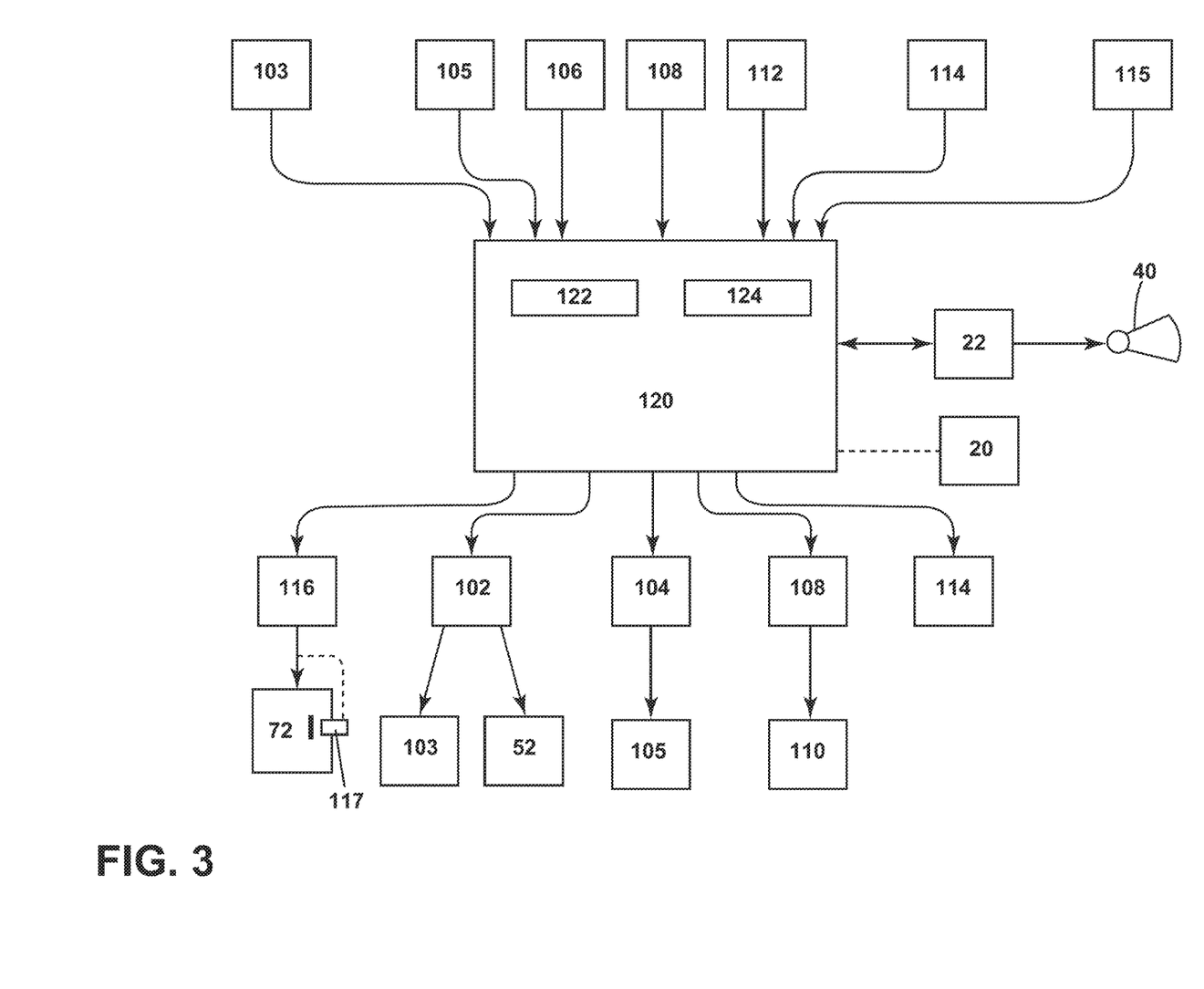
FIG. 3 is a schematic illustration of the attention tracking system of FIG. 2 according to various aspects described herein.

FIG. 3 schematically illustrates components of the tracking system 100 in exemplary communicative connection, where a separate controller 120 is shown in signal connection with the various modules and sensors described above. Alternatively, it will be understood that the flight control computer 22 can be utilized or that each module or any combination of modules can include their own controller, processor, or memory. Arrows have been included to indicate an exemplary signal or control direction, and are provided for clarity in discussion. It will be understood that any signal communication or control between connected components in FIG. 3 can be transmitted in either direction, and an arrow's illustrated direction does not imply a one-way signal or control direction.

A door lock module 116 with a door lock sensor 117 can further be included in the tracking system 100. For example, a cockpit door 72 can include the door lock module 116 configured to sense whether the door 72 is locked or unlock. The module 116 can also automatically lock or unlock the door 72 based on a control signal within the tracking system 100.

The controller 120 can be operably connected to and receive input from any or all of the flight control computer 22, image sensor 103, audio sensor 105, biometric sensor 106, seat tracking module 108, seat belt sensor 112, haptic feedback generator 114, timer 115, or door lock module 116. Any of the inputs received by the controller 120 can be stored in the memory 124. For example, the memory 124 can store a history of audio input or recordings from data gathered within the cockpit 16, or an elapsed time since a pilot last interacted with a flight display 52 (FIG. 2).

The processor 122 of the controller 120 can send a signal or control command to any or all of the imaging module 102, audio module 104, seat tracking module 108, haptic feedback generator 114, or door lock module 116. In one non-limiting example, upon receipt of combined input from the biometric sensor 106 and timer 115 that a pilot's eyes have been closed for a predetermined time duration, the processor 122 can issue a command to the haptic feedback generator 114 to vibrate one or both seats 54, 55 (FIG. 2) to increase an alertness level of the pilot or co-pilot. In another non-limiting example, the processor 122 can send a signal to the imaging module 102, such as a visual message to be read by the pilot or co-pilot on the flight display 52, or a command to enable or disable the image sensor 103.

It is further contemplated that the controller 120 of the tracking system 100 can issue a signal or command to another aircraft system, such as the communication interface 40 via the flight control computer 22. In such a case, the controller 120 can communicate with an external aircraft or ground station (not shown). The controller 120 can also be communicatively coupled with any other aircraft system 20 as desired.

Figure 4:
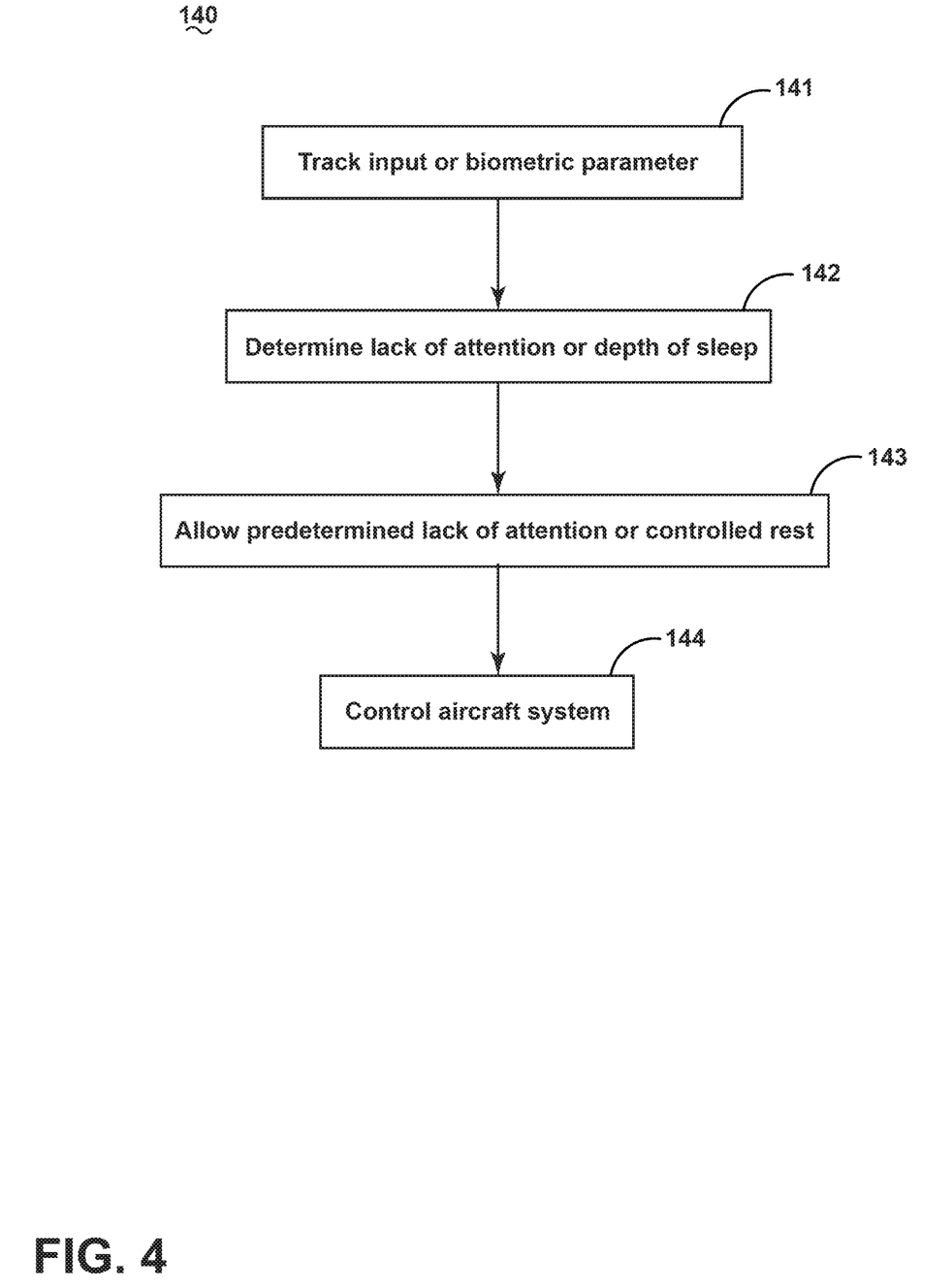
FIG. 4 is a flowchart illustrating a method of controlling the aircraft of FIG. 1 according to various aspects described herein.

Referring now to FIG. 4, a method 140 of controlling the aircraft 10 is illustrated. The method 140 begins at 141 with tracking an input by a first pilot such as the pilot located within the seat 54 or tracking a biometric parameter of the first pilot during flight of the aircraft 10 using at least one sensor within the tracking system 100. Tracking pilot input can be accomplished via the image sensor 103, such as visually detecting the pilot's hand interacting with the keyboard 58 or flight display 52. In an example where the flight display 52 includes a touchscreen, the controller 120 can detect that the pilot has touched or interacted with the touchscreen flight display 52. Tracking pilot input can also be accomplished via the flight control computer 22 which is communicatively coupled to the controller 120, including tracking that the pilot has interacted with or entered input to any cockpit system e.g. the keyboard 58 or the cursor control device 56. Tracking a biometric parameter of the pilot can be accomplished via the at least one biometric sensor 106 as described above, such as heart rate, breathing rate, skin temperature, and the like.

At 142, the controller 120 can determine a lack of attention or depth of sleep of the first pilot based on the tracked pilot input or biometric parameter(s) from 141. For example, the timer 115 in conjunction with the flight control computer 22 can indicate to the controller 120 that the pilot has not interacted with any cockpit system for a length of time greater than a threshold time, such as ten minutes. The controller 120 can then determine a lack of attention of the pilot accordingly. The controller 120 can also or alternatively determine, at 142, a lack of attention or depth of sleep of the pilot based on the biometric parameter. For example, any or all of the image sensor 103, audio sensor 105, or biometric sensor 106 can determine that a pilot's eyes are closed and moving rapidly (e.g. during REM sleep), that a pilot's eyes are open but gazing ahead steadily (such as during microsleep), that a pilot's rate of breathing has slowed, or that a pilot has not generated any noise.

At 143, a predetermined amount of lack of attention by the pilot, or a controlled rest of the pilot, can be allowed by the tracking system 100. Such an allowed predetermined lack of attention can allow for short absences of the pilot, such as a restroom break, or for deliberate losses of attention by the pilot such as during a controlled rest period. In one example, the controller 120 can receive a flight plan from the flight control computer 22 and identify a portion of the flight plan where lack of attention or controlled rest of a pilot is allowable. Such a portion could be when at cruising altitude where no inclement weather or turbulence has been reported and no changes in heading are expected. When the aircraft 10 reaches the pre-identified portion of the flight plan (e.g. as indicated by the flight control computer 22), the controller 120 can provide an indication (such as via the audio module 104 or imaging module 102) that controlled rest is allowable.

It is further contemplated that the controller 120 can also verify secondary conditions, related to the controlled rest, before providing an indication to the pilot or co-pilot that controlled rest is allowable. For example, the controller 120 can verify that the second pilot, such as the co-pilot in the seat 55 (FIG. 3), is present in the cockpit 16, not sleeping, sufficiently alert, and that the co-pilot's seat belt is buckled (e.g. via the seat belt sensor 112) before indicating that controlled rest of the pilot is allowable. In another example, the controller 120 can verify that the pilot's seat (e.g. the seat 54) is positioned away from any controls such that inadvertent movements of the pilot will not adjust aircraft operation before indicating that controlled rest of the pilot is allowable. Such verification can include verifying the seat distance 110 (FIG. 3) is greater than a predetermined value, or that food pedals (not shown) are moved away from the pilot's feet.

In addition, the method can include setting the timer 115 based on a beginning of the lack of attention or the controlled rest. The timer 115 can also be set based on a biometric parameter. In a non-limiting example, a pilot's planned controlled rest may be scheduled to begin at 11:00 am and allow for 20 minutes of sleep followed by a 20 minute recovery period. Input from the biometric sensor 106 can indicate to the controller 120 that the pilot does not actually begin sleep until 11:10 am. In such a case, the timer 115 can begin the planned 20-minute countdown starting at 11:10 am or when the pilot actually falls asleep. It can be appreciated that customizing the timer based on actual sleep onset can provide for a reduction in sleep inertia, as the pilot can be awakened before falling into deeper stages of sleep.

When the timer 115 reaches a predetermined time (e.g. 20 minutes of controlled rest), the controller 120 can initiate a wake procedure to bring the pilot's attention or alertness back to acceptable levels. The wake procedure can include at least one of activating an audible signal on the aircraft, such as via the audio module 104, or vibrating a seat of the pilot via the haptic feedback generator 114. It can be appreciated that the wake procedure can prevent the pilot from entering REM stage sleep or other deeper stages of sleep that can cause undesirable levels of sleep inertia upon waking.

In addition, the controller 120 can be configured to automatically initiate a recovery procedure upon determination of a pilot's incapacitation or unacceptable absence. The recovery procedure can include any procedure that can correct the pilot's unacceptable absence (e.g. the pilot returning to the cockpit 16) or bring the pilot back to an alert state (e.g. waking a sleeping pilot, or re-engaging an inattentive pilot). For example, the recovery procedure can include at least one of activating an audible signal on the aircraft 10 via the audio module 104, vibrating a seat of the pilot via the haptic feedback generator 114, unlocking a cockpit door 72 via the door lock module 116 to allow authorized personnel to enter the cockpit, executing an automatic landing via a flight system such as the flight control computer 22, allowing remote control of the aircraft 10 via a ground system, or activating the distress tracker 21 for the aircraft 10. In another example, the recovery procedure can include transmitting a message to another aircraft or a ground system (not shown) via the communication interface 40. It is further contemplated that allowing remote control of the aircraft 10 further includes automatically updating a flight plan of the aircraft 10 and executing the updated flight plan.

In another non-limiting example where the tracking system 100 determines a lack of attention for an otherwise awake pilot, the controller 120 can be configured to present the pilot with at least one task or cognitive challenge to re-engage the pilot's attention. Such a task can include updating a flight log, moving the cursor control device 56 (FIG. 2) through a predetermined pattern, solving a brief puzzle on a flight display 52 (FIG. 2), or the like. Optionally, the controller 120 can present a task or cognitive challenge at regular intervals to a pilot or co-pilot throughout the duration of a flight plan, or during periods where lack of attention is likely to set in as determined by the tracking system 100.

At 144, at least one aircraft system 20 can be controlled by the controller 120 when the determined lack of attention or determined depth of sleep satisfies a predetermined threshold that indicates unacceptable absence of the pilot or incapacitation of the pilot. Non-limiting examples of predetermined thresholds include the pilot being absent from the cockpit 16 for more than 20 minutes with the co-pilot present in the cockpit 16, or a pilot not interacting with any aircraft system for 2 minutes while the audio module 104 plays an alert tone and the haptic feedback generator 114 vibrates the pilot's seat. Furthermore, a flight plan can be automatically updated to direct the aircraft 10 to a suitable alternate location and the autopilot commanded to perform an automatic landing; control of the aircraft 10 can also be given to a remote station for landing. In addition, control of the cockpit door 72 (e.g. locking or unlocking) can provide for any other pilots on board the aircraft to enter the cockpit and attempt to land the aircraft 10.

The sequence depicted is for illustrative purposes only and is not meant to limit the method 140 in any way. It will be understood that the portions of the method 140 can proceed in a different logical order, additional or intervening portions can be included, or described portions of the method can be divided into multiple portions, or described portions of the method can be omitted without detracting from the described method.

Figure 5:
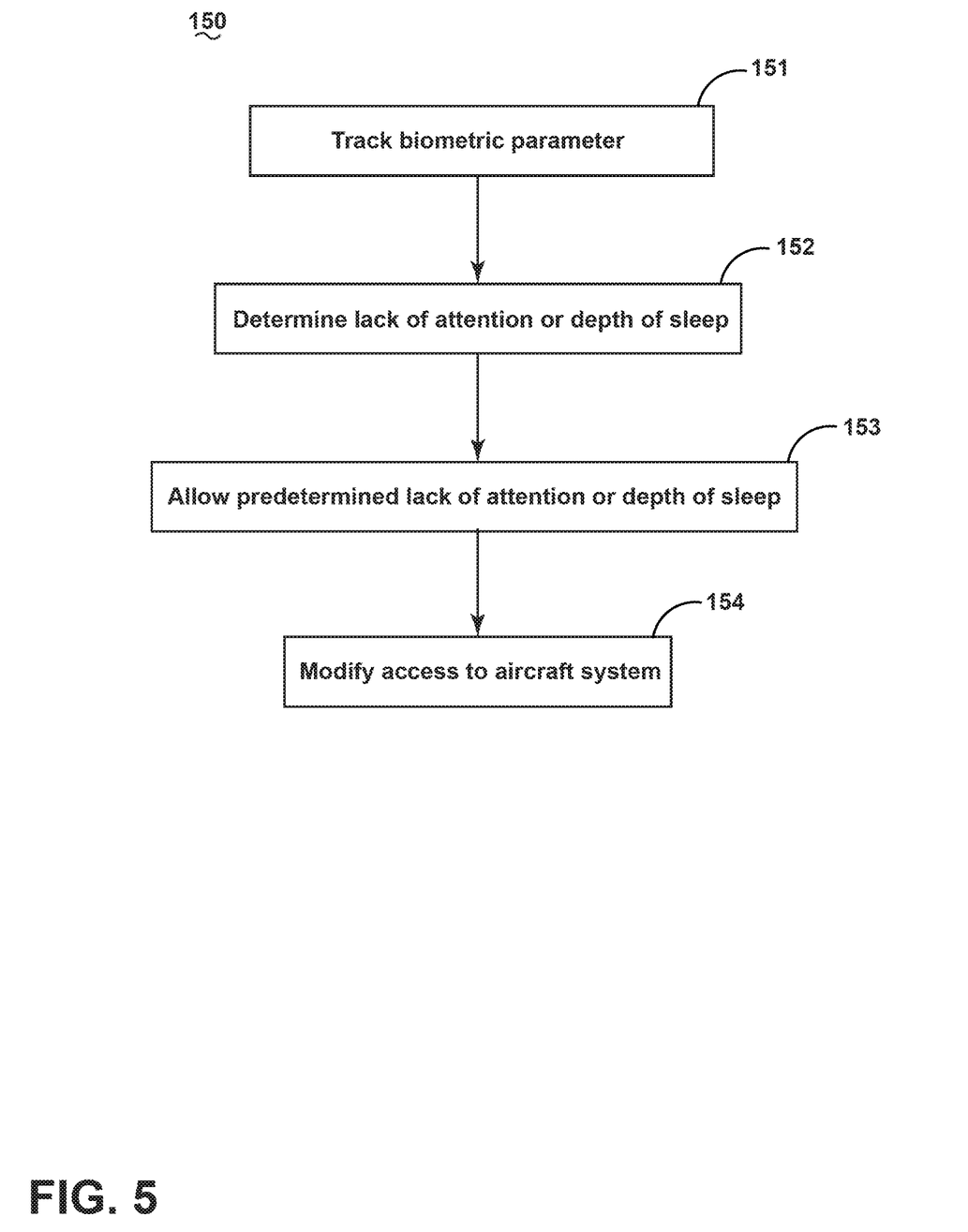
FIG. 5 is a flowchart illustrating another method of controlling the aircraft of FIG. 1 according to various aspects described herein.

Turning to FIG. 5, another method 150 of controlling the aircraft 10 is shown. The method includes, at 151, tracking a biometric parameter of the pilot during flight of the aircraft 10, such as via the biometric sensor 106 as described above. At 152, the controller 120 can determine, based on sensor input, a lack of attention or depth of sleep of the pilot based on the biometric parameter. At 153, the controller 120 can allow a predetermined amount of lack of attention or depth of sleep of the pilot, including identifying a portion of a flight plan where controlled rest is allowable as described above. Secondary conditions can be verified by the controller before allowing the predetermined lack of attention or depth of sleep of the pilot, including verifying that the co-pilot is present, not sleeping, or wearing a seat belt. Further, the co-pilot's interaction with cockpit systems can be tracked by the tracking system 100 during the controlled rest of the pilot.

At 154, when the pilot's amount of lack of attention or depth of sleep satisfies a predetermined threshold, the controller 120 can modify access to a system of the aircraft 10. For example, the predetermined threshold can include that the pilot has initiated a sleep stage such as during an allowable controlled rest. In one example of modified system access, the seat tracking module 108 can be instructed to move the pilot's seat back from a first position 109 near the flight deck 30 to a second position 111 farther from the flight deck 30, thereby increasing the seat distance 110 from the flight deck 30 or any sensitive controls thereon (FIG. 2). Increasing the seat distance 110 can prevent the pilot from interacting with any controls or aircraft systems positioned nearby, such as near legs, feet, or hands. Another example of modified system access includes locking out the pilot from interacting with any of the flight displays 52, from entering data via the keyboard 58, or from adjusting a flight system via the cursor control device 56 (FIG. 2). In this manner the pilot can be denied access to the system for a predetermined amount of time, such as during the controlled rest period, during a recovery period after waking, or during both. In another example, the pilot can be denied access to all systems during the controlled rest period and be given limited system access during a recovery period after waking. In still another example, the pilot can be denied access to all systems during the controlled rest period but be granted full access before the end of the controlled rest period if sufficient demonstration of alertness or wakefulness is determined by the tracking system 100, such as being awakened during an emergency. Non-limiting examples of demonstration of alertness or wakefulness include correct responses to a series of questions presented by a flight display 52, accurately selecting a series of objects using the cursor control device 56 within a specified time period, data entry via the multifunction keyboard 58 with no errors, or a biometric determination via the biometric sensor 106 such as eye tracking, heart rate tracking, or movement or gesture tracking consistent with a predetermined threshold of "alert" or "awake."

The sequence depicted is for illustrative purposes only and is not meant to limit the method 150 in any way. It will be understood that the portions of the method 150 can proceed in a different logical order, additional or intervening portions can be included, or described portions of the method can be divided into multiple portions, or described portions of the method can be omitted without detracting from the described method.

The technical effect is that the above described aspects enable the determination of pilot incapacitation, allow for lack of attention or some sleep by a pilot, and the controlling of an aircraft based on the determination. The above described aspects also enable the tracking of a pilot's attention, input, or biometric parameter, and controlling an aircraft or modifying access to an aircraft system based on the tracking. Advantages or benefits of the above described aspects include increased safety during flight and improved detection of pilot incapacitation. It can be appreciated that inputs by a pilot to any part of the cockpit systems can be tracked and validated as corresponding to normal activity. If no activities are detected (e.g. movement of stick/yoke, or command inputs into display system), a request for acknowledgement can be provided with a cognitive challenge to ensure alertness of pilot. Cockpit sensors can provide for further validation of a state of the pilot or co-pilot, such as eye tracking, posture tracking, pulse, or breathing. Additional aspects of the disclosure allow for planned absence or deliberate loss of attention such as controlled rest, and the tracking system disclosed herein can account for such planned loss of attention before signaling an alarm or initiating recovery procedures.

In the case of controlled rest, aspects of the present disclosure can also prevent a sleeping pilot's descent into deep sleep or REM sleep which can otherwise lead to disorientation of the pilot. Further, in the event of confirmed or determined pilot incapacitation, aspects of the disclosure provide for a recovery procedure involving any or all of audible alarms, vibrating seats, or an automatic distress tracker set to increasing levels such as "unstable" or "distress" for communication with an external aircraft or ground system. It can be appreciated that such aspects described can reduce pilot fatigue and increase alertness.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling an aircraft, the method comprising:
   tracking, using at least one sensor, one of an input by a pilot or a biometric parameter of a pilot during flight of the aircraft;
   determining, using a controller that is operatively connected to the at least one sensor, a lack of attention by the pilot or a depth of sleep of the pilot based on the biometric parameter;
   customizing a timer based on the lack of attention by the pilot or a controlled rest;
   controlling at least one system of the aircraft when a predetermined amount of lack of attention or a predetermined depth of sleep satisfies a predetermined threshold;
   setting the timer based on a beginning of the lack of attention or the controlled rest;
   providing a wake procedure when the timer reaches a predetermined time to prevent sleep inertia upon waking.

2. The method of claim 1 wherein the predetermined threshold indicates one of unacceptable absence or incapacitation of the pilot.

3. The method of claim 2, further comprising automatically initiating a recovery procedure upon determination of the unacceptable absence or the incapacitation.

4. The method of claim 3 wherein the recovery procedure includes at least one of activating an audible signal on the aircraft, vibrating a seat of the pilot, unlocking a cockpit door, executing an automatic landing via a flight system, allowing remote control of the aircraft, or activating a distress tracker for the aircraft.

5. The method of claim 4 wherein allowing remote control of the aircraft further includes automatically updating a flight plan of the aircraft and executing the updated flight plan.

6. The method of claim 1 wherein tracking the input by the pilot includes tracking an input to any cockpit system.

7. The method of claim 1, further comprising identifying a portion of a flight plan of the aircraft where lack of attention or controlled rest is allowable.

8. The method of claim 7, further comprising providing an indication within a cockpit of the aircraft that the controlled rest is allowable.

9. The method of claim 1 wherein the wake procedure includes at least one of activating an audible signal on the aircraft or vibrating a seat of the pilot.

10. A method of controlling an aircraft, the method comprising:
    tracking, using at least one sensor, a biometric parameter of a first pilot during flight of the aircraft;
    determining, using a controller that is operatively connected to the at least one sensor, a depth of sleep of the first pilot based on the biometric parameter;
    allowing a predetermined amount of depth of sleep;
    providing a wake procedure to prevent the first pilot from entering REM stage sleep in order to prevent sleep inertia upon waking; and
    modifying access to a system of the aircraft when the amount of depth of sleep satisfies a predetermined threshold.

11. The method of claim 10, further comprising identifying a portion of a flight plan of the aircraft where controlled rest is allowable.

12. The method of claim 11, further comprising providing an indication within a cockpit of the aircraft that the controlled rest is allowable.

13. The method of claim 12, further comprising verifying secondary conditions, related to the controlled rest, before providing the indication.

14. The method of claim 13 wherein the secondary conditions including verifying at least one of: that a second pilot is present, that a second pilot is not sleeping, or that a second pilot is wearing a seat belt.

15. The method of claim 10, further comprising tracking a second pilot's interaction with cockpit systems during a controlled rest of the first pilot.

16. The method of claim 10, further comprising setting a timer based on the biometric parameter.

17. The method of claim 16, further comprising providing a wake procedure when the timer reaches a predetermined time and wherein the wake procedure includes at least one of: activating an audible signal on the aircraft or vibrating a seat of the first pilot.

18. The method of claim 10 wherein the wake procedure includes at least one of: activating an audible signal on the aircraft or vibrating a seat of the pilot.

19. The method of claim 10 wherein the modifying access to the system includes at least one of moving a seat of the first pilot or denying access to the system for a predetermined amount of time.

* * * * *